Patented Jan. 14, 1941

2,228,289

UNITED STATES PATENT OFFICE 2,228,289

DIAZOTIZABLE AZO DYESTUFFS

Fritz Suckfüll, Leverkusen-Wiesdorf, and Heinrich Clingestein, Cologne-on-the-Rhine, Germany, assignors to General Aniline & Film Corporation, a corporation of Delaware No Drawing. Application March 9, 1938, Serial No. 194,832. In Germany March 3, 1937

9 Claims. (Cl. 8—46)

The present invention relates to new diazotizable azo dyestuffs, to a method of preparing the same, to a process of dyeing and to dyed fibers; more particularly it relates to diazotizable yellow azo dyestuffs which may be represented by the general formula:

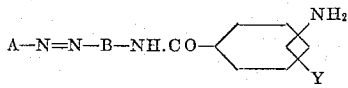

In this formula A—N=N stands for the radical of a diazo compound which may contain one or several azo groups and also free hydroxy groups, being suitable for the formation of yellow azo dyestuffs and being free from diazotizable amino groups, B stands for an arylene radical and Y stands for a negativating substituent.

Our new dyestuffs are obtainable by causing yellow azo dyestuffs of the formula:

A—N=N—B—NH$_2$ wherein A and B mean the same as stated above to react with an aroyl halide containing in the aryl nucleus besides a substituent being convertible into the amino group, such as a nitro group or an acylamino group, a negativating substituent and converting the said convertible substituent into the amino group, for instance by reduction or saponification.

Suitable aroyl halides for our process are halides of the following formula:

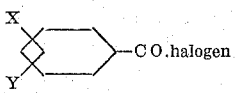

wherein X stands for a substituent being convertible into the amino group such as a nitro group or an acylamino group and Y stands for a negativating substituent, as, for instance, —CN, —SO$_2$—, —CO—, —NO$_2$, or halogen; the divalent substituents —SO$_2$— and —CO— have one bond attached to the aryl nucleus, while the other bond may carry any radical. Such halides are, for instance, cyanonitrobenzoyl chlorides, mono- or dihalogen-nitro-benzoyl chlorides, dinitrobenzoyl chlorides, the acid chlorides of nitrophenylalkylsulfone carboxylic acids and so on.

Our new dyestuffs shown in contrast to the known dyestuffs, which do not contain the negativating substituent in the amino aroyl radical the advantage, when diazotized on the fibre and developed with β-naphthol, of yielding yellower shades. The diazotizable dyestuffs used until now for yellow shades had to be developed with pyrazolones in order to obtain the yellow shade, for, when developed with β-naphthol, these dyestuffs yield red to orange shades. The technical advantage of the present dyestuffs become chiefly evident in shading, as in the dyeing practice mostly not the pure diazotizable dyestuffs but mixtures of the same are used, in order to obtain different shades in different directions, such as fashion shades and so on. Although most of the diazotizable dyestuffs are developed with β-naphthol a yellow-shading was not possible with dyestuffs of the "β-naphthol series" up to the present. The known yellow diazotizable dyestuffs had, without exception, to be developed with pyrazolone as already mentioned above, and therefore they were not suitable for shading in the "β-naphthol series". Only such a diazotizable dyestuff can be suitable for this purpose which yields developed with β-naphthol yellow shades, since it is practically not possible to develop either successively or simultaneously with β-naphthol and pyrazolone. In some cases it was possible to shade with orange instead of yellow, however, the reddish tinge shown by the dyeings thus produced mostly proved very undesirable. Owing to this quite a number of shades wanted could not be obtained. In the dyeing practice therefore the ardent want existed for diazotizable dyestuffs which can be developed to yellower shades with β-naphthol and with which yellow-shading can be carried out without difficulties. For the first time diazotizable dyestuffs of this kind are disclosed by the present invention; they meet a long felt want and therefore represent a remarkable and important advance in the art.

The following examples illustrate the invention, without however restricting it thereto, the parts being by weight:

Example 1

303 parts of 2-naphthylamino-6.8-disulfonic acid are diazotized with 69 parts of sodium nitrite, 110 parts of m-toluidine—dissolved in hydrochloric acid—are added to the diazo compound. When the coupling is complete, the dyestuff is isolated by adding acid until the liquid shows a reaction acid to Congo red, dissolved in water with sodium carbonate to a neutral solution, and then treated at 60–65° C. with 200 parts of p-nitrobenzoyl chloride and an acid binding agent. After the completed condensation the nitrobenzoylated dyestuff is dissolved in water and reduced at 60° C. with 420 parts of crystallized sodium sulfide. The reduced dyestuff is dissolved in water to a neutral solution and 75 parts of sodium nitrite and then 500 parts of hydrochloric acid (19.5° Bé.) are added. After the excess of nitrous acid has been removed, a solution of 110 parts of m-toluidine in hydrochloric acid is added to the diazo compound and coupling is completed by adding sodium acetate.

The aminodisazo dyestuff is isolated by adding acid until the liquid shows a reaction acid to Congo red, dissolved in water to a neutral solution and treated with the chloride of 4-carboxy- 2-nitrophenylmethylsulfone of the following constitution:

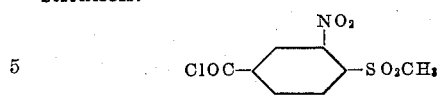

in the presence of an acid binding agent, until the amino group can no longer be detected by diazotizing. After the condensation is complete the dyestuff is isolated, again dissolved and reduced at 75° C. with 420 parts of crystallized sodium sulfide. The isolation of the complete dyestuff is effected by adding salt. The dyestuff which corresponds in its free state to the following formula:

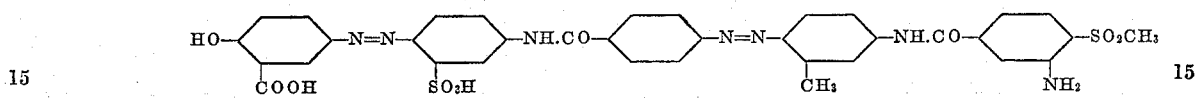

dyes cotton after diazotization and developing with β-naphthol essentially yellower shades than the corresponding dyestuff which does not contain the methyl sulfone radical.

*Example 2*

230 parts of 4-aminoacetanilide-3-sulfonic acid are dissolved in water with sodium carbonate to a neutral solution, 320 parts of hydrochloric acid (19.5° Bé.) and at 10° C. slowly 69 parts of sodium nitrite are added. The diazo compound is run into a solution prepared from 140 parts of salicylic acid and 275 parts of sodium carbonate. After the coupling is complete the dyestuff is separated by adding acid, dissolved in 3500 parts of water to a neutral solution and 170 parts of sodium hydroxide are added. By heating to 80° C. the acetyl group is split off. After intermediate isolation the dyestuff is treated at 75° C. in the presence of an acid-binding agent, with p-nitro-benzoyl-chloride, until the amino group can no longer be detected by diazotising.

530 parts of the dyestuff thus obtained of the following constitution:

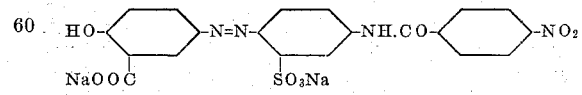

are reduced in water at 60–65° C. with 420 parts of crystallized sodium sulfide. The isolated reduction product is dissolved in water, further diazotized with 75 parts of sodium nitrite and 500 parts of hydrochloric acid (19.5° Bé.) and the diazo solution is united with 110 parts of m-toluidine and an excess of sodium acetate. After the coupling is complete, the mixture is treated with the chloride of 4-carboxy-2-nitrophenylmethyl sulfone until the amino group can no longer be detected by diazotizing. The reduction of the nitro group is effected with 420 parts of crystallized sodium sulfide in an aqueous solution at 75° C. The complete dyestuff is separated by adding salt, isolated and dried. It corresponds in its free state to the following formula:

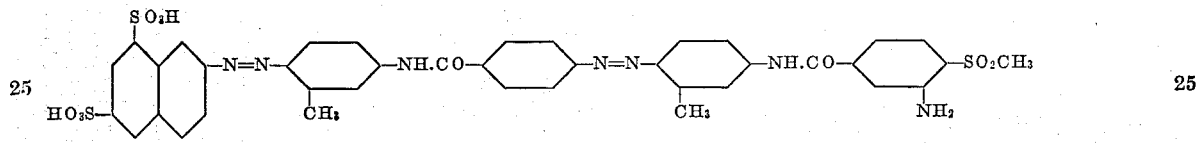

and dyes cotton after diazotization and developing with β-naphthol essentially yellower shades than the corresponding dyestuff which does not contain the methylsulfone group.

*Example 3*

On substituting in Example 2 3.5-dinitrobenzoylchloride for the chloride of the 4-carboxy-2-nitrophenylmethylsulfone and treating the dinitrobenzoyl dyestuff with 420 parts of crystallized sodium sulfide at 75° C. until one nitro group is reduced to the amino group, a dyestuff is obtained which corresponds in its free state to the following formula:

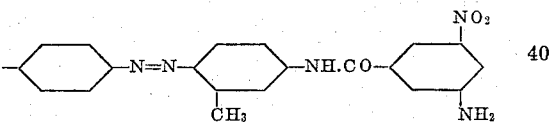

and which, when dyed on the fiber, diazotized and developed with β-naphthol, yields distinctly yellower shades than the corresponding reduced dyestuff prepared from 3-nitrobenzoyl-chloride, which only differs from the first dyestuff by the absence of the nitro group.

We claim:

1. As new products the diazotizable yellow azo dyestuffs of the general formula

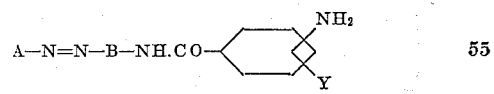

wherein A—N=N stands for the radical of a diazo compound being suitable for the formation of yellow azo dyestuffs and being free from diazotizable amino groups, B stands for an arylene radical of the benzene series and Y stands for a negativating substituent selected from the group consisting of —CN, —NO₂, halogen, —SO₂—, and —CO— the free valences of the SO₂ and CO groups being connected to an organic radical.

2. As new product the diazotizable yellow azo dyestuff which corresponds in its free state to the following formula:

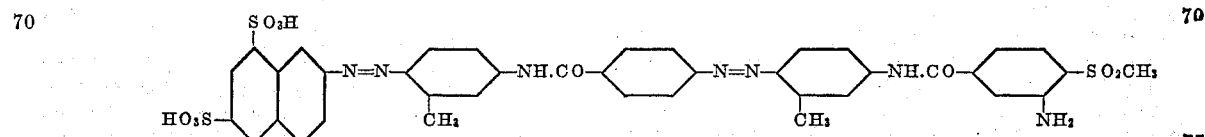

3. As new product the diazotizable yellow azo dyestuff which corresponds in its free state to the following formula:

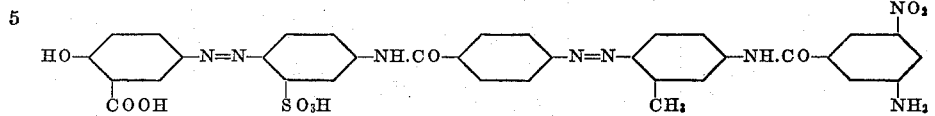

4. The process which comprises applying to cellulosic fibres a diazotizable yellow dyestuff of the general formula

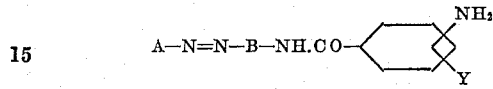

wherein A—N=N— stands for the radical of a diazo compound being suitable for the formation of yellow azo dyestuffs and being free from diazotizable amino groups, B stands for an arylene radical of the benzene series and Y stands for a negativating substituent selected from the group consisting of —CN, —NO$_2$, halogen, —SO$_2$—, and —CO— the free valences of the SO$_2$ and CO groups being connected to an organic radical, diazotizing and coupling with β-naphthol.

5. The process which comprises applying to cellulosic fibers the diazotizable yellow azo dyestuff which corresponds in its free state to the following formula

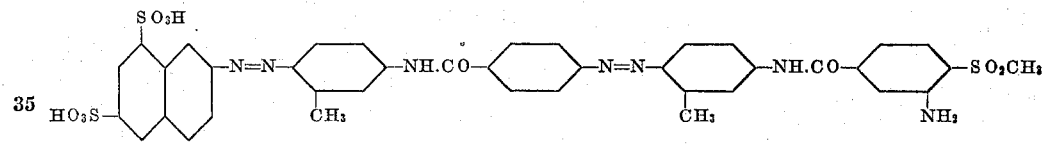

diazotizing and coupling with β-naphthol.

6. The process which comprises applying to cellulosic fibers the diazotizable yellow azo dyestuff which corresponds in its free state to the following formula

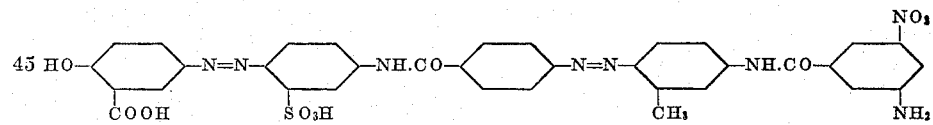

diazotizing and coupling with β-naphthol.

7. Cellulosic fibers dyed according to a process as claimed in claim 4.

8. Cellulosic fibers dyed according to a process as claimed in claim 5.

9. Cellulosic fibers dyed according to a process as claimed in claim 6.

FRITZ SUCKFÜLL.
HEINRICH CLINGESTEIN.